(12) United States Patent
Cha et al.

(10) Patent No.: US 6,284,202 B1
(45) Date of Patent: Sep. 4, 2001

(54) DEVICE FOR MICROWAVE REMOVAL OF NOX FROM EXHAUST GAS

(75) Inventors: Chang Yul Cha; Charles T. Carlisle, both of Laramie, WY (US)

(73) Assignee: Cha Corporation, Laramie, WY (US)

( * ) Notice: Subject to any disclaimer, the term of this patent is extended or adjusted under 35 U.S.C. 154(b) by 0 days.

(21) Appl. No.: 09/550,760

(22) Filed: Apr. 17, 2000

Related U.S. Application Data

(63) Continuation-in-part of application No. 08/943,653, filed on Oct. 3, 1997, now abandoned.

(51) Int. Cl.[7] .................................................. B01J 19/08
(52) U.S. Cl. ...................................... 422/186; 422/186.29
(58) Field of Search ............................... 422/186, 186.29

(56) References Cited

U.S. PATENT DOCUMENTS

| | | | | |
|---|---|---|---|---|
| 4,935,114 | * | 6/1990 | Varma | 204/157.43 |
| 5,536,477 | * | 7/1996 | Cha et al. | 422/171 |
| 6,027,698 | * | 2/2000 | Cha | 422/186 |

* cited by examiner

*Primary Examiner*—Kathryn Gorgos
*Assistant Examiner*—Thao Tran
(74) *Attorney, Agent, or Firm*—John O. Mingle

(57) ABSTRACT

The subject invention is a commercial device to effectively remove NOx and other pollutants from an exhaust gas stream. Microwave enhancement of oxidation/reduction catalysis is selectively employed as the exhaust gas stream traverses a bed of catalyst particles, which may operate as either a fixed or fluidized bed. An unique feature involves the conventional, non-microwave, conversion of NO to $NO_2$; however, the subsequent reaction of reducing $NO_2$ is microwave enhanced.

5 Claims, 1 Drawing Sheet

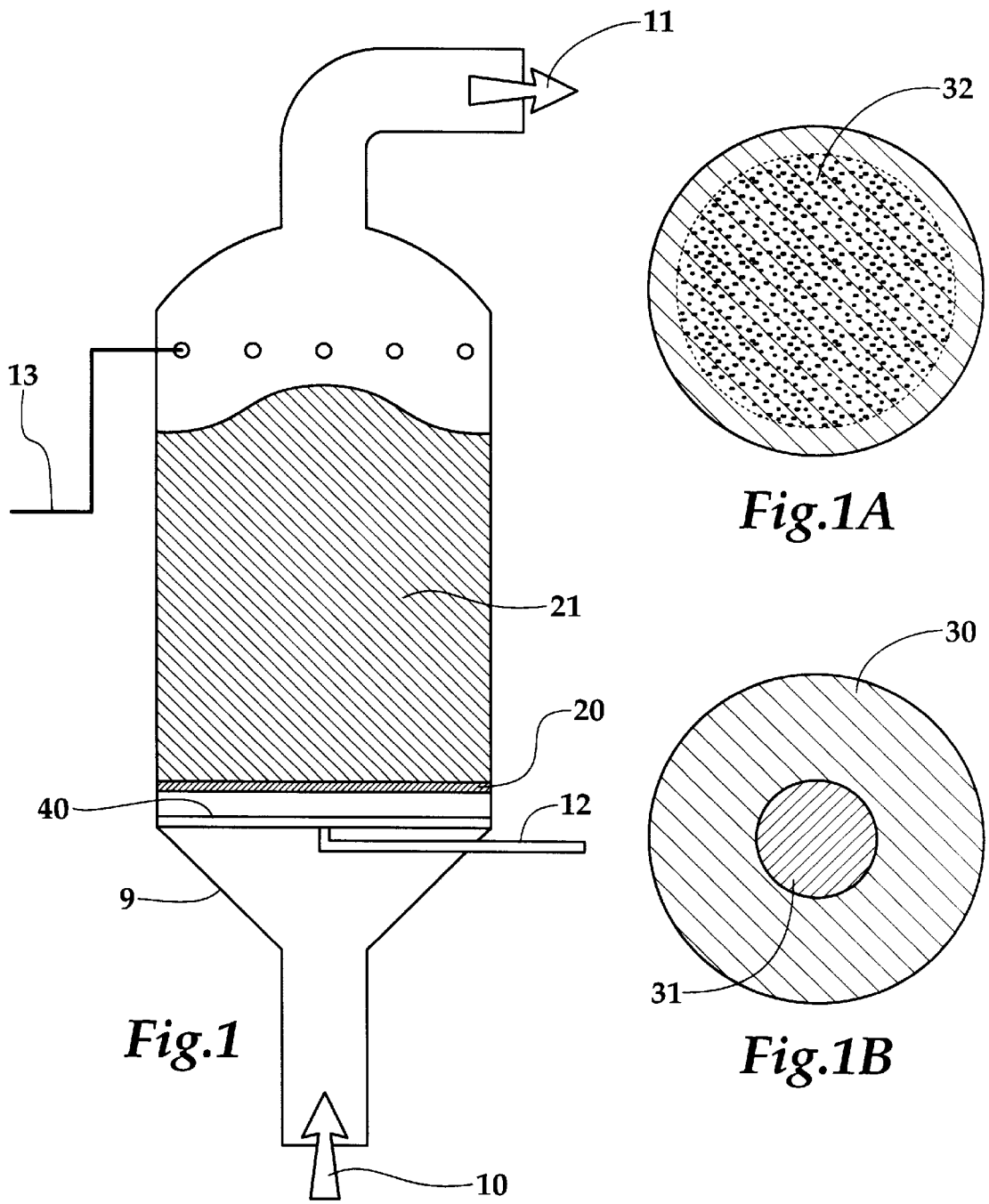

DEVICE FOR MICROWAVE REMOVAL OF NOX FROM EXHAUST GAS

This is a continuation-in-part of U.S. Ser. No. 08/943,653, filed Oct. 3, 1997, now abandoned.

BACKGROUND OF INVENTION

1. Field of Invention

The present invention relates to a commercial device for removing NOx from a gas stream by employing microwave enhanced chemical reactions.

2. Background

Most gas streams, such as a diesel engine exhaust, contain many pollutants but always an important one is NOx. If combustion products are present then NOx and many other substances occur all of which require removal before release to the environment. Such pollutants include nitrogen oxides, carbon monoxide, particulate matter like soot, volatile organic compounds, and other hazardous air pollutants. In addition most combustion processes operate with considerable excess oxygen, usually from air—the likely source of the nitrogen which forms NOx—so that these combustion gases still contain residual oxygen, often in considerable amount.

In particular from a commercial viewpoint it is economically desirable to remove all combustion pollutants with one pass through an appropriate device and not have to employ successive apparatuses to fully accomplish the needed pollutant removal. The subject invention often accomplishes this with a selective bed employing appropriate catalysts along with astute microwave usage even though it is designed chiefly for NOx reduction.

A particularly difficult to remove combustion pollutant is nitrogen oxides present in various forms and usually identified as NOx to incorporate both NO and $NO_2$. Microwave reduction of NOx proceeds well in the presence of pyrolytic carbon, such as char and soot, provided the oxygen content of the gas is small, generally less than 6 percent. As the oxygen content of the gas exceeds this 6 percent level, the removal of NOx becomes less and less efficient. Cha has shown this removal for the low oxygen situation in U.S. Pat. Nos. 5,246,554; 5,256,265; 5,269,892; and 5,362,451; and the specifications of these patents are hereby incorporated by reference. The high oxygen situation is covered by Cha's U.S. Pat. Nos. 5,767,470 and 6,027,698 whose specifications are hereby incorporated by reference. However the subject invention because of its unique design does not have any practical oxygen limitations as it works well under all oxygen conditions.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is conveniently divided into ultrasonic, microwave, and optical regions. The microwave region runs from 300 Mhz (megahertz) to 300 GHz (gigahertz) and encompasses frequencies used for much communication equipment. A treatise of such information is presented by Southworth, *Principles and Applications of Waveguide Transmission,* Nostrand, N.Y., 1950, which is herewith incorporated by reference.

Often the terms, microwave, microwaves and microwave energy are used interchangeably and are applied to a broad range of radiofrequency energies, such as 500 Mhz to 5000 MHz, particularly with respect to the common frequencies, 915 MHz and 2450 MHz. The former is often employed in industrial heating applications while the latter is the frequency of the common household microwave oven.

The absorption of microwaves by the energy bands, particularly the vibrational energy levels, of the atoms or molecules results in the thermal activation of the nonplasma material and the excitation of valence electrons. The nonplasma nature of these interactions is important for a separate and distinct form of heating employs plasma formed by arc conditions at a high temperature, often more than 3000° F., and at much reduced pressures or vacuum conditions. For instance, refer to Kirk-Othmer, *Encyclopedia of Chemical Technology,* 3rd Edition, Supplementary Volume, pages 599–608, Plasma Technology. In microwave technology, as applied in the subject invention, neither condition is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a much reduced extent. An example is the heating of polar water molecules in a common household microwave oven where the container is of nonpolar material, that is, microwave-passing, and stays relatively cool.

As used above microwaves are often referred to as a form of catalysis when applied to chemical reaction rates. For instance, see Kirk-Othmer, *Encyclopedia of Chemical Technology,* 3rd Edition, Volume 15, pages 494–517, Microwave Technology.

Related United States microwave patents include:

| No. | Inventor | Year |
| --- | --- | --- |
| 4,935,114 | Varma | 1990 |
| 5,087,272 | Nixdorf | 1992 |
| 5,246,554 | Cha | 1993 |
| 5,256,265 | Cha | 1993 |
| 5,269,892 | Cha | 1993 |
| 5,362,451 | Cha | 1994 |
| 5,277,770 | Murphy | 1994 |
| 5,423,180 | Nobue et al. | 1995 |
| 5,536,477 | Cha et al. | 1996 |
| 5,767,470 | Cha | 1998 |
| 6,027,698 | Cha | 2000 |

Referring to the above list, Varma discloses a process for enhancing certain chemical reactions with microwaves; however, he only discloses laboratory equipment operating at above 400° C. (752° F.) and additionally has no variable flow control equipment. Conversely the subject invention requires careful control of the flowing gas as well as structural and temperature limits at about 500° F. to produce an economically commercial apparatus.

Nixdorf discloses using a filter containing silicon carbide whiskers to remove particulate matter from a gas stream and then clean said filter with microwave heating. The subject invention is not just a filter.

Cha ('554) discloses removing gas oxides by adsorption on a char bed and then reduction by microwaves as two distinct steps. The subject invention does not employ radiofrequency catalysis using char.

Cha ('265) discloses removing gas oxides in a homogeneous mixture with soot carried out in a waveguide reactor. In contrast the subject invention does not actively employ homogeneous reduction involving soot and further has non-microwave conditions.

Cha ('892) discloses a pyrolytic carbon bed for removal of gas oxides using only microwave catalysis. The subject invention is not restricted to microwave catalysis.

Cha ('451) discloses a waveguide reactor to efficiently perform radiofrequency catalysis. The subject invention does not employ a waveguide reactor.

Murphy discloses reactivating plasma initiators using microwaves in the presence of oxygen, which is checked by a methane conversion reaction, where such plasma initiators are, or contain, metallic catalysts. The subject invention has no connection with the plasma regime of gases but does employ conventional metallic catalysts.

Nobue et al. disclose a filter regeneration system for an internal combustion engine using microwaves. The subject invention is not just a filter.

Cha et al. ('477) disclose a pollution arrestor using a soot filter followed by catalytic sections, using only reducing catalysts, to remove various gaseous pollutants with the total assembly within a microwave cavity. This pollution arrestor using only a reducing catalyst does not perform satisfactorily under high oxygen conditions. Conversely the subject invention performs well under all oxygen conditions, incorporates an oxidation/reduction catalyst rather than just a reducing catalyst, and employs a single flexible bed arrangement rather a series of multiple beds.

Cha ('470) discloses a process for pollution removal under high oxygen conditions using a series of beds containing various particle beds. Cha ('698) which is the device divisional of '470 discloses the apparatus for such a pollution removal, which has multiple beds with serial gas flow. Conversely the subject invention is based upon a single bed of varying particles that serves multiple functions when properly exposed to microwaves.

SUMMARY OF INVENTION

The objectives of the present invention include overcoming the above-mentioned deficiencies in the prior art and performing effective removal of NOx and other pollutants with a single device containing one bed of selected particles exposed to microwaves. The most difficult pollutant is NO and requires a special particle bed arrangement to encourage its conversion to $NO_2$ before final reduction to $N_2$.

BRIEF DESCRIPTION OF THE DRAWINGS

FIG. 1 shows the NOx removal device in its fluidized bed configuration.

FIG. 1A shows a catalyst bed particle in cross-section with dispersed SiC.

FIG. 1B shows a catalyst bed particle in cross-section with a SiC center.

DETAILED DESCRIPTION OF INVENTION

The pollutants associate with an exhaust gas, such as a combustion gas, include products representing nitrogen oxides (NOx), carbon monoxide (CO), particulate matter less than 10 microns (PM10), unburned products of combustion, volatile organic compounds (VOC), and other hazardous air pollutants (HAP). Most of the soot is likely present in PM10 material.

Traditionally the conventional method to remove the full range of combustion pollutants involves several distinct steps. First the particulate matter is filtered out which requires replacing filters and regenerating the subsequent clogged filters. For removal of NOx selective noncatalytic reduction is employed by using a reducing agent, such as anhydrous ammonia or urea, injected immediately after combustion and is often employed in large coal-fired power plants, but the efficiency is low. Alternatively a selective catalytic reduction is employed where the gases after addition of a reducing agent are past through a reduction catalyst that produces nitrogen gas and water, but good efficiency requires high temperatures greater than 750° F. Unutilized ammonia is often an additional problem in this conventional removal process for NOx.

NOx removal to greater than ninety percent is desirable; however, such a high level of elimination often requires multiple stages of NOx processing in this conventional procedure. Once particulate matter and NOx are treated, then any other combustion pollutants are oxidized in a conventional manner often by the use of an appropriate catalyst.

Because of various process conditions the conventional treatment of a general exhaust gas requires three operating levels and separate equipment. The subject invention overcomes this restriction by using a single device employing only one selective particle bed.

The subject invention employs microwaves which are a versatile form of energy that is applicable to enhance chemical reactions, since the energy is locally applied by its vibrational absorption by polar molecules and does not produce plasma conditions. A class of enhanced reactions is those whose reaction kinetics appear unfavorable at relative low bulk temperature conditions, such as about 300° F.

Ideally NOx is reduced as follows:

$$2NO \rightarrow N_2 + O_2 \quad (1)$$

$$2NO_2 \rightarrow N_2 + 2O_2 \quad (2)$$

commonly in the presence of a reducing catalyst and often a reducing agent. When radiofrequency catalysis occurs, pyrolytic carbon is employed giving:

$$2NO + C - (RF) \rightarrow N_2 + CO_2 \quad (3)$$

where (RF) means that microwave energy is applied. Cha in previously referenced patents applies this form of radiofrequency catalysis. However a competing reaction is occurring:

$$C + O_2 - (RF) \rightarrow CO_2 \quad (4)$$

as excess oxygen is nearly always present, and when oxygen occurs in high concentration, greater than about six percent, Eq.(4) is the predominant reaction at the expense of Eq.(3). Therefore radiofrequency catalysis using pyrolytic carbon is not efficient for NOx removal under high oxygen conditions. Cha previously showed that by adding an additional step:

$$2NO + O_2 \rightarrow 2NO_2 \quad (5)$$

$NO_2$ is more readily reduced using Eq.(2) than previously was NO using Eq.(1). Further using a reducing agent:

$$NO_2 + \text{hydrocarbons} \rightarrow CO_2 + N_2 + H_2O \quad (6)$$

Equations (5) and (6) are particularly suited to high oxygen conditions although it is also conveniently employable with only a small excess of $O_2$ particularly if no other chemical reactions involving oxygen are competing. In general Eq.(6) is enhanced my microwave usage in bringing the catalyst surface, where the reduction occurs to a modestly higher temperature such as 500° F., than employing the normal bulk operating temperature. Conversely the same microwave enhancement of Eq.(1) requires a much higher surface catalyst temperature, about 750° F., which is often unfeasible to economically obtain.

FIG. 1 shows a configuration of the NOx removal commercial device when the single, specialized bed becomes fluidized. Exhaust gas 10 enters the bottom of the container 9, passes through the fluidized bed 21 and leaves at the top 11 quite reduced in NOx content. The fluidized bed 21 is held in place under nonflow conditions by a screen 20 which then creates a fixed bed system, which potential is non-uniform in particle configuration, if the entering exhaust gas 10 is below fluidization velocity. Additionally in a fixed bed configuration the gas flow is likely non-uniform. The microwave source 13, commonly of a fixed frequency for a fluidization process but of variable intensity, at the top of the bed is a meander line microwave coupler or equivalent that directionally radiates the whole circular bed. Often this microwave source is potentially below as well as above the bed and is of variable frequency and intensity. The 7 reducing agent 12 is added below the bed near the gas inlet by a nozzle 40, which sprays into the flowing exhaust gas stream 10.

FIG. 1A shows an individual hybrid catalyst particle from the bed 21 and represents a substantially homogenous dispersal of silicon carbide material of about 50 mesh embedded throughout the catalyst substrate composing the particle 32. FIG. 1B shows the best mode as the hybrid catalyst particle is composed of a center of silicon carbide 31 and an outer shell of oxidation/reduction catalyst 30, likely Pt/Rh with its substrate of alumina or zeolite. Another configuration for the bed particles is to employ a mixture of both silicon carbide particles and platinum-rhodium catalyst particles with their substrate, and because of density differences, they are likely not the same size. All fluidized bed particles are preferably in the 2–60 mesh range as long as sufficient gas flow is available to perform the needed fluidization. In the case where different sizes and weights of particles are employed, then stratification of the fluidized bed may occur, however, this is often an advantage if different types of particles are employed. The fixed bed particles are not so limited in size, but still 2–60 mesh is convenient.

A unique aspect of the subject invention is that it requires both microwave and non-microwave processes in the same particle bed. In the subject invention when a bed of uniform compound catalyst particles embedded with SiC is employed, a non-microwave region is obtained by shielding away from microwaves with an adequate thickness of the catalyst bed, and this occurs when either fixed or fluidized beds are employed. Microwaves, like any electromagnetic radiation, have a penetration distance through a material that is defined by an exponential falloff. For practical concerns a penetration depth is defined for a given material as a 1/e reduction in radiation intensity or about 63 percent loss. For more information see Metaxas and Meredith, *Industrial Microwave Heating,* Peter Peregrinus Ltd., 1983, which is hereby incorporated by reference. As far as microwave enhancement of catalytic chemical reactions, one penetration depth of catalyst particles reduces the intensity of the microwave energy so that a minor reaction rate change occurs, and certainly after two penetration depths no chemical rate effect change is prudently measurable.

For best results the thickness for a fluidized bed of catalyst particles, measured in its nonflow fixed bed configuration, is at least approximately twice this penetration depth. For the best mode subject catalyst bed, 2–60 mesh Pt/Rh deposited over an SiC center, this penetration distance is about three inches for microwaves of 2450 MHz; thus, a bed height of six inches is conveniently utilized. If the radiofrequency energy frequency is larger, greater than 2450 MHz, then this penetration distance is smaller, conversely if the radiofrequency is smaller, then this penetration distance is larger.

Since bed thickness is a critical design parameter, for any particular combination of selected catalyst particles with a given size and density, an experimental measurement of penetration distance versus frequency of microwaves is prudently obtained.

For normal fluidized bed usage a fixed microwave frequency source placed above the bed is feasible since the bed in continually mixing and particles that are in the lower portion of the bed and are shielded from microwaves will eventually traverse to the upper portions of the bed and obtain microwave exposure. This means that for catalyst particle operation the lower portions of the bed, which are essentially microwave shielded, will absorb or adsorb, which process depends upon the particular molecule and the condition of the surface, gaseous chemical species upon the catalyst surface where the chemical reactions will occur when such fluidized bed particles traverse themselves to the top of the bed where microwaves are present.

In most practical situations the microwave source is placed above the fluidized bed, but is feasible also below the bed. Since the catalyst is a compound oxidation/reduction type—such as Pt/Rh—either oxidation or reduction can occur in both portions, with or without microwaves, of the fluidized bed depending upon the reaction conditions.

When a fixed bed is employed with an exhaust gas flowing through it, variable frequency microwave energy source, or sources, are employed and placed at the top or bottom of the bed. This variable frequency radiofrequency energy is from 10 to 10000 MHz, preferably 50 to 5000 MHz, and its penetration depth through the fixed bed of catalyst particles will vary over time depending upon which frequency is occurring at that given instant. For instance, if the microwave source is at the top of the fixed bed, then with a high enough frequency only the upper part of the bed is exposed to microwave radiation and the lower portion is for practical purposes microwave shielded; conversely if the microwave source is at the bottom of the fixed bed, then the reverse occurs. This shielding effect is frequency dependent, and when the frequency is reduced, the extended portions of the bed are exposed to microwaves and the enhanced chemical reactions will occur. Thus the needed range of microwave frequencies is traversed by the radiofrequency generator or microwave source over a cyclic time period, for instance about a minute or so, and then repeats itself.

The subject invention employs a bed of catalyst particles preferably in the 2–60 mesh size and allows the processing of soot as any other pollutant since any soot collected on the particles will eventually burn off from microwave exposure, as that portion of the catalyst bed undergoes microwave radiation. A convenient bulk temperature for soot removal is about 300° F., but temperatures up to about 500° F. are not uncommon. Periodic microwave energy is sometimes utilized under high soot conditions. Even if the bed particles were noncatalytic, some microwave catalytic reduction of NOx to $N_2$ occurs in the presence of this surface deposited soot, a form of pyrolytic carbon, and the amount depends upon the level of oxygen concentration, the lower the better, and this further enhances pollutant removal.

In high oxygen situations it is necessary to react NO to the $NO_2$ chemical form which is then reduced to elemental nitrogen by the conventional compound oxidation/reduction catalyst under different conditions of the bed. This oxidation occurs in the section or portion of the bed where microwaves are essentially absent and employs an oxidation catalyst to insure substantial NO is converted to $NO_2$. In order to insure that the substantial reduction of $NO_2$ happens in the presence of the Pt/Rh catalyst when this reaches the microwave portion of the bed, a conventional reducing agent is employed. This reducing agent is a thermally stable hydrogen-containing material, such as No. 2 distillate fuel oil or its common equivalent, JP-8.

Additionally in this microwave portion of the bed, other oxidizable pollutants, which are often adsorbed or absorbed in the nonmicrowave portion of the bed, are oxidized, and thus removed, particularly under high oxygen conditions.

Depending upon the required design conditions, in order to reduce the NOx concentration to low enough levels for release to the atmosphere, which generally requires a 90 percent reduction, identical multistages of the subject invention are feasible.

For a preferred configuration the compound Pt/Rh catalyst is deposited over a small sphere of SiC making a hybrid catalyst particle as shown in FIG. 1A. The inner core of SiC absorbs microwaves readily, and not being exposed to surface gas cooling, retains much energy which subsequently continues to activate the outer catalyst shell. Such a hybrid catalyst particle has the attributes of enhancing both oxidation and reduction chemical reactions when exposed to microwaves. However if microwaves are not present, such hybrid catalyst particle still is chemically active like a conventional homogeneous catalyst particle.

In terms of the reducing agent, the properties of No. 2 distillate fuel oil are reported in Perry, *Chemical Engineers' Handbook*, 6th Ed., pages 9–10 to 9–13, and this information is hereby incorporated by reference. An important property of JP-8 or any reducing agent is thermal stability at a temperature of about 500° F. Further its volatility is such so that it is injected as a liquid but quickly evaporates into the vapor state as mixing occurs with the flowing gases. The important properties of JP-8, a nontrademark designation established by the United States Air Force, include a specific gravity, 60/60° F. in the range of 0.788 to 0.845; a hydrogen content of a minimum of 13.5 weight percent; a boiling range of 300 to 626° F.; a freezing point of a maximum of −58° F.; and an aromatic content of a maximum of 25 volume percent. In general a reducing agent is employed selected from the group consisting of normal-hexane, iso-hexane, JP-8, number two grade of fuel oil, and combinations thereof The subject invention can be summarized as a commercial device for NOx removal from an exhaust gas stream comprising a structural microwave cavity with sufficient structural integrity to operate continuously on a commercial level at 500° F. A bed enclosed by said cavity composed of compound oxidation/reduction catalyst particles, composed of both oxidation catalyst and reduction catalyst materials combined together in one particle, and these are interspersed with a form of microwave energy absorbing material, such as pyrolytic carbon and including silicon carbide. This further allows for variable sized particles from 2–60 mesh to comprise said bed so that a stratified bed can occur during operation. Further the bed thickness consists of at least two penetration depths measured with microwaves of 2450 MHz, a convenient frequency for fluidized bed operation, and with a prudent choice of particle size, this is often near six inches in depth.

Compound oxidation/reduction catalyst particles interspersed with a form of microwave energy absorbing material are selected from the group consisting of compound platinum/rhodium catalyst deposited over a silicon carbide center forming heterogeneous hybrid bed particles; compound platinum/rhodium catalyst uniformly mixed with fine, 50–60 mesh, silicon carbide forming homogeneous hybrid bed particles; compound platinum/rhodium catalyst particles uniformly externally mixed with silicon carbide particles; compound platinum/rhodium catalyst particles non-uniformly externally mixed with silicon carbide particles; and combinations thereof, wherein all said particles are 2–60 mesh in size. Because the bed is not restricted to uniform particle arrangements, the bed may also contain a layer of only compound oxidation/reduction catalyst particles with no microwave energy absorbing material in said layer.

A dynamic controller for longitudinal flow of said gas stream is capable of sufficient management of the gas velocity to allow flexible bed operation, which is selected from the group consisting of fluidized bed, fixed bed, and combinations thereof. Depending upon the bed composition, this flow controller may produce a fully fluidized bed, a partially fluidized bed—often referred to as semi-fluidized bed—or a fixed bed. Further such flow conditions are not constant but potentially adustable in time providing for cyclic operation.

A microwave source radiating said cavity is positioned at a bed external location within said gas flow, wherein said location is selected from the group consisting of top, bottom, and combinations thereof. Any convenient directional microwave source is employable but often a meander line microwave coupler or equivalent is convenient.

Finally a liquid injector is positioned within said cavity near said gas inlet to add sufficient reducing agent to perform the necessary catalytic reduction for the amount of pollution present in the exhaust gas stream. Any excess reducing agent is oxidized away by the oxidizing portion of the bed.

The microwave generator or source or applicator is employable in a continuous, pulsed, cyclic, and periodic modes with a frequency range of 10 to 10,000 MHz, preferably 50 to 5000 MHz, and is capable of operating in a variable frequency manner in any mode.

In all configurations of this device it is employed to remove exhaust 6 gas pollutants besides NOx which are potentially selected from the group consisting of soot, carbon monoxide, particulate matter less than 10 microns, unburned products of combustion, volatile organic compounds, other hazardous air pollutants, and combinations thereof.

As is common with bed operations, the actual diameter of the bed is a function of the amount of flowing exhaust gas. For instance, a device for a single diesel engine is physically considerably smaller than such a device for the combustion treatment coming from a large power plant. A commercial production model is sized in accordance with variables of the exhaust gas stream, such as the flow rate and concentration of pollutants, in order to obtain a reasonable pressure drop and to reduce the level of pollutants to an acceptable value. Further under fluidization conditions adequate gas flow through the bed must occur in order to produce the desired degree of fluidization.

The subject invention represents a very flexible device capable of supporting a wide range of operating conditions since it contains a bed with particles having a size range of 2–60 mesh composed of largely compound oxidation/reduction catalyst particles and a form of microwave energy absorbing material, often silicon carbide, but said bed is not necessarily uniform in composition. Further the gas flow through the bed is variable producing fixed, cyclic, or periodic conditions ranging from full fluidization to a static bed. Additionally the bed microwave cavity is radiated, either from the top or bottom or both, with continuous, cyclic, pulsed, or periodic modes of fixed or variable frequency microwaves. All these conditions affect the rate of chemical reactions occurring and thus the rate and degree of NOx and other pollutants removal.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. A commercial device for NOx removal from an exhaust gas stream comprising:

a structural microwave cavity;

a bed with a designated gas stream inlet enclosed by said cavity composed of compound oxidation/reduction catalyst particles interspersed with a form of microwave energy absorbing material, wherein said bed is selected from the group consisting of fluidized bed, fixed bed, and combinations thereof; and a microwave source radiating said cavity positioned at an external location of said bed, which is selected from the group consisting of top, bottom, and combinations thereof, a control means for selecting the frequency of said microwave source is used with reference to the frequency's penetration depth through said bed, and wherein said bed is divided into dynamic sections by said penetration depth.

2. The device according to claim 1 wherein said bed thickness further comprises two penetration depths measured with microwaves of 2450 MHz.

3. The device according to claim 1 wherein said microwave source further comprises being capable of flexible operation selected from the group consisting of continuous source, pulsed source, static frequency, dynamic frequency, and combinations thereof, and wherein said source is further selected from the frequency range of 500 to 5000 MHz.

4. The device according to claim 1 wherein said compound oxidation/reduction catalyst particles interspersed with a form of microwave energy absorbing material further comprise being selected from the group consisting of compound platinum/rhodium catalyst deposited over a silicon carbide center forming composite bed particles, compound platinum/rhodium catalyst particles uniformly externally mixed with silicon carbide particles, compound platinum/rhodium catalyst particles non-uniformly externally mixed with silicon carbide particles, and combinations thereof, wherein all said particles are 2–60 mesh in size.

5. The device according to claim 1 further comprising a liquid nozzle located near said gas stream inlet.

* * * * *